United States Patent
Kurokawa (10) Patent No.: US 10,257,478 B2
(45) Date of Patent: Apr. 9, 2019

(54) OPTICAL SCANNING HEAD-MOUNTED DISPLAY AND RETINAL SCANNING HEAD-MOUNTED DISPLAY

(71) Applicant: Takayuki Kurokawa, Tokyo (JP)

(72) Inventor: Takayuki Kurokawa, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/704,478

(22) Filed: Sep. 14, 2017

(65) Prior Publication Data

US 2018/0091783 A1 Mar. 29, 2018

(30) Foreign Application Priority Data

Sep. 29, 2016 (JP) .................. 2016-192102

(51) Int. Cl.
*H04N 3/08* (2006.01)
*H04N 9/31* (2006.01)
*H04N 5/232* (2006.01)
*G02B 27/01* (2006.01)
(Continued)

(52) U.S. Cl.
CPC ....... *H04N 9/3129* (2013.01); *G02B 27/0172* (2013.01); *H04N 5/23229* (2013.01); *H04N 5/23296* (2013.01); *H04N 9/3188* (2013.01); *G02B 26/101* (2013.01); *G02B 2027/014* (2013.01); *G02B 2027/0138* (2013.01);
(Continued)

(58) Field of Classification Search
CPC ............... H04N 9/3129; H04N 9/3188; H04N 5/23229; H04N 5/23296; H04N 7/0122; H04N 7/0125; H04N 9/3185; H04N 3/08; G02B 27/0172; G02B 26/101; G02B 2027/014; G02B 2027/0138
See application file for complete search history.

(56) References Cited

U.S. PATENT DOCUMENTS

2016/0282618 A1* 9/2016 Kon ................. G06F 3/011
2017/0084203 A1* 3/2017 Aguren ............. A61H 5/00

FOREIGN PATENT DOCUMENTS

| CN | 104883527 | 9/2015 |
| EP | 1064783 | 6/2003 |
| JP | 2008-310130 | 12/2008 |

(Continued)

OTHER PUBLICATIONS

Extended European search report for European Patent Application No. 17193331.0 dated Feb. 13, 2018.

*Primary Examiner* — Abhishek Sarma
(74) *Attorney, Agent, or Firm* — IPUSA, PLLC (57) ABSTRACT

An optical scanning head-mounted display includes a head mount unit including a light source that emits a light beam, an optical scanner that scans the light beam to irradiate the light beam onto a projection plane, an image capturing device that outputs image data of a captured image as the image data in a first format, and an interface that converts the image data in the first format obtained from the image capturing device into the image data in a second format and outputs the image data in the second format; a transmission cable that transmits the image data in the second format; and a controller that receives the image data in the second format through the transmission cable and controls the emission of the light beam from the light source based on the image data in the second format.

6 Claims, 6 Drawing Sheets

(51) Int. Cl.
*H04N 7/01* (2006.01)
*G02B 26/10* (2006.01)

(52) U.S. Cl.
CPC ............ *H04N 3/08* (2013.01); *H04N 7/0122* (2013.01); *H04N 7/0125* (2013.01); *H04N 9/3185* (2013.01)

(56) References Cited

FOREIGN PATENT DOCUMENTS

| | | |
|---|---|---|
| JP | 2011-076503 | 4/2011 |
| JP | 2016-075735 | 5/2016 |
| WO | 99/049656 | 9/1999 |
| WO | 2015/092968 | 6/2015 |
| WO | 2015/134733 | 9/2015 |
| WO | 2016/051775 | 4/2016 |
| WO | 2017/183445 | 10/2017 |

* cited by examiner

OPTICAL SCANNING HEAD-MOUNTED DISPLAY AND RETINAL SCANNING HEAD-MOUNTED DISPLAY

BACKGROUND OF THE INVENTION

1. Field of the Invention

The present disclosure relates to an optical scanning head-mounted display and a retinal scanning head-mounted display.

2. Description of the Related Art

In recent years, a head-mounted display device has been known, which is to be attached to a head. In the display device, a camera for capturing an image of an outside view is provided in an image display unit to be attached to the head; the image of the outside view in a direction in which a user faces is captured by the camera; and the captured content is transmitted from the image display unit to a controller through a wire.

Further, in the display device, the controller generates a signal for controlling an optical image display unit included in the image display unit. The image display unit controls the optical image display unit based on the signal, so that the image of the content captured by the camera is to be displayed.

RELATED-ART DOCUMENTS

Patent Documents

[Patent Document 1] Japanese Unexamined Patent Publication No. 2016-75735

SUMMARY OF THE INVENTION

In the above-described technique, the image data of the image captured by the camera is transmitted to the controller through the wire. However, deterioration of the image by the transmission is not considered.

There is a need for an optical scanning head-mounted display and a retinal scanning head-mounted display that can suppress deterioration of an image during transmission of image data.

According to an aspect of the present disclosure, there is provided an optical scanning head-mounted display including a head mount unit including a light source that emits a light beam; an optical scanner that scans the light beam to irradiate the light beam onto a projection plane; an image capturing device that outputs image data of a captured image as the image data in a first format; and an interface that converts the image data in the first format obtained from the image capturing device into the image data in a second format and outputs the image data in the second format; a transmission cable that transmits the image data in the second format; and a controller that receives the image data in the second format through the transmission cable and controls the emission of the light beam from the light source based on the image data in the second format.

According to another aspect of the present disclosure, there is provided a retinal scanning head-mounted display including a head mount unit including a light source that emits a light beam, an optical scanner that scans the light beam to irradiate the light beam onto a retina of a user, an image capturing device that outputs image data of a captured image as the image data in a first format, and an interface that converts the image data in the first format obtained from the image capturing device into the image data in a second format and outputs the image data in the second format; a transmission cable that transmits the image data in the second format; and a controller that receives the image data in the second format through the transmission cable and controls the emission of the light beam from the light source based on the image data in the second format.

According to the disclosed technique, deterioration in quality of the image can be suppressed during transmission of the image data.

DESCRIPTION OF THE PREFERRED EMBODIMENTS

In an embodiment, a head mount unit to be attached to a user's head is provided with an interface for converting image data captured by an image capturing device installed in a head mount unit into the image data suitable for transmission to a controller through a cable.

Figure 1:
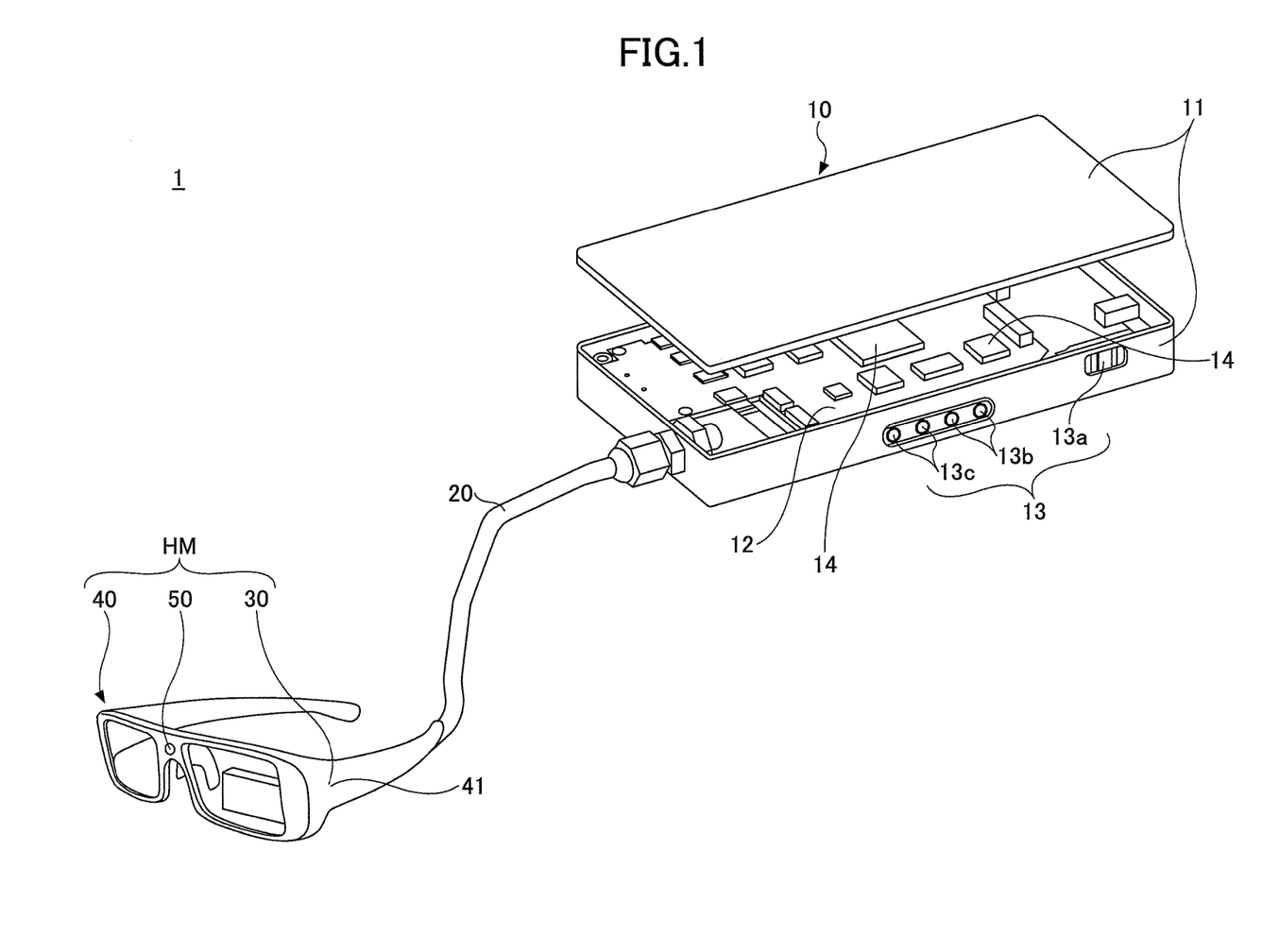
FIG. 1 is a first diagram illustrating retinal scanning head-mounted display.

In the following, the embodiment is described by referring to the drawings. FIG. 1 is a diagram illustrating a retinal scanning head-mounted display.

The retinal scanning head-mounted display 1 according to the embodiment is a retinal scanning head-mounted display that utilizes a Maxwellian view. A Maxwellian view is a method of causing a user to visually recognize an image represented by image data without being affected by a function of a crystalline lens of the user by projecting image light based on the image data (which may also be referred to as an image light beam, hereinafter) on a retina after the image light is converged once at a center of a pupil.

An overall configuration of the retinal scanning head-mounted display 1 is described. As illustrated in FIG. 1, the retinal head-mounted display 1 is provided with a controller 10; a transmission cable 20; and a head mount unit HM.

The controller 10 has a size such that the controller 10 is capable of being carried by being accommodated in a pocket, etc., of user's clothes. The controller 10 emits, as image light, a laser beam with intensity according to an image signal. Details of the controller 10 are described below.

The transmission cable 20 transmits the image light emitted from the controller 10 to an optical scanner 30.

The head mount unit HM includes the optical scanner 30; an eyeglass frame 40; and an image capturing unit 50.

The optical scanner 30 projects an image indicated by image light onto a retina of a user by scanning the image light transmitted by the transmission cable 20 to irradiate the image light onto an eyeball (retina) of the user.

The eyeglass frame 40 is configured so that it can be attached to a head of a user. The image capturing unit 50 is provided with a camera, etc. The optical scanner 30 and the image capturing unit 50 are included in the eyeglass frame 40.

Here, the image light is light generated based on information that can be a source of an image to be projected onto a user's retina by the optical scanner 30. The information that can be the source of the image may be a symbol, such as a character and a number, or may be an image.

The controller 10 is provided with a case 11 that can be operated by a user; an electronic circuit board 12; and an operation unit 13. The operation unit 13 is provided on a side surface of the case 11. The operation unit 13 is provided with, for example, a power supply switch 13a; a phase switch 13b; an adjuster 13c for adjusting a size of an image. The electronic circuit board 12 is accommodated inside the case 11. A plurality of IC chips 14 for implementing the operation of the controller 10 is mounted on the electronic circuit board 12.

Figure 2:
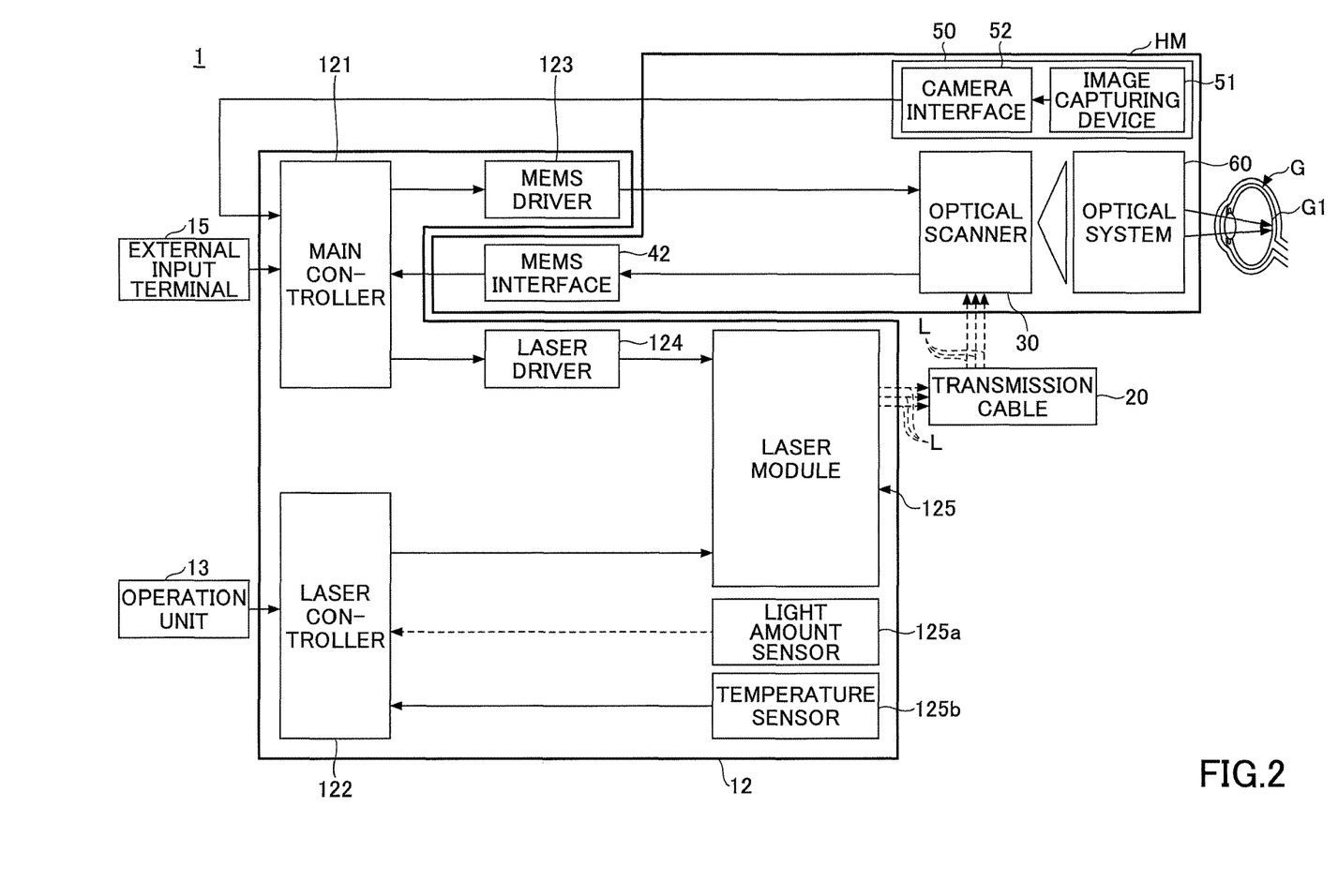
FIG. 2 is a second diagram illustrating the retinal scanning head-mounted display.

The optical scanning controller 10 is provided with an external input terminal 15 (cf. FIG. 2). The controller 10 receives content information, etc., transmitted from an external device, such as a personal computer, which is not depicted, through the external input terminal 15. Note that the content information is information to be projected onto a retina of a user, such as a character, an image, and video. Specifically, the content information is, for example, a text file, an image file, a video file, etc., used for a personal computer.

The controller 10 according to the embodiment is configured so that image signals can be input from two systems. One of the image signals from the two systems is an image signal input from the image capturing unit 50, and the other one of the image signals from the two systems is an image signal input from an external device.

From the above-described point, the operation unit 13 according to the embodiment is provided with a selection switch (not depicted) for allowing a user to select whether to project the image signal from the image capturing unit 50 onto a retina or to project the image signal from the external device onto the retina.

FIG. 2 is a second diagram illustrating the retinal scanning head-mounted display 1 according to the embodiment. In FIG. 2, a configuration of the head mount unit HM, and circuit blocks implemented on the electronic circuit board 12 are illustrated.

First, the head mount unit HM is described.

The head mount unit HM according to the embodiment is provided with the optical scanner 30; a Micro Electro Mechanical System (MEMS) interface 42; the image capturing unit 50; and an optical system 60.

The optical scanner 30 is, for example, a Micro Electro Mechanical System (MEMS) mirror. The optical scanner 30 is, for example, arranged at a temple 41 of the eyeglass frame 40. The optical scanner 30 scans image light emitted from a laser module 125, which is described below, in a horizontal direction and in a vertical direction based on a drive control signal. The drive control signal is output from an MEMS driver 123, which is described below.

Furthermore, as a method of projecting an image onto a retina G1 of an eye ball G by scanning the image light, a method (e.g., raster scan) can be implemented such that an image is displayed by scanning light at high speed from upper left to lower right in a region onto which the image is to be projected.

The image light emitted from the optical scanner 30 is converged by the optical system 60 to be projected onto the retina G1. Note that the optical system 60 is arranged in a lens part of the eyeglass frame 40.

The MEMS interface 42 detects a motion (deflection angle) of the optical scanner 30 (MEMS mirror) and outputs motion information corresponding to the tilt of the optical scanner 30 to a main controller 121, which is described below. Note that the MEMS interface 42 according to the embodiment may be provided with a temperature sensor (not depicted), and the MEMS interface 42 may detect a temperature of the optical scanner 30 to output temperature information to the main controller 121.

The image capturing unit 50 according to the embodiment includes an image capturing device 51 and a camera interface 52.

The image capturing device 51 is a camera including an image sensor, such as a complementary metal-oxide-semiconductor (CMOS) image sensor. The image capturing device 51 outputs, to the camera interface 52, the image data captured in a format determined by a specification, etc., of the image capturing device 51.

The camera interface 52 outputs the image data output from the image capturing device 51 to the main controller 121, which is described below. The camera interface 52 according to the embodiment converts the image data received from the image capturing device 51 into image data with a format suitable for transmission by the transmission cable 20, and, then, the camera interface 52 outputs the converted image data to the main controller 121.

Furthermore, the camera interface 52 according to the embodiment generates a plurality of voltages from a power supply voltage supplied to the camera interface 52 to provide the plurality of voltages to the image capturing device 51. Furthermore, upon detecting that an operation to indicate zoom-in or zoom-out of the captured image is made at the operation unit 13 of the controller 10, the camera interface 52 according to the embodiment applies, to the image data output from the image capturing device 51, image processing that corresponds to the operation.

Details of the camera interface 52 according to the embodiment are described below.

Next, the circuit blocks of the electronic circuit board 12 of the controller 10 are described.

In the electronic circuit board 12, the main controller 121; a laser controller 122; the MEMS driver 123; a laser driver 124; and the laser module (light source) 125 are implemented.

The main controller 121 is implemented by a processor, such as a central processing unit (CPU), a random access memory (RAM), a read-only memory (ROM), etc. Image data from two systems, i.e., image data output from the image capturing unit 50 and content information (image data) output from an external device through the external input terminal 15, are input to the main controller 121. The main controller 121 executes processing of the input image signal and drive control of the optical scanner 30 (MEMS mirror).

Furthermore, based on the motion information, the temperature information, etc., of the optical scanner 30 obtained from the MEMS interface 42, the main controller 121 controls driving of the optical scanner 30 (MEMS mirror) and emission of image light from the laser module 125.

Furthermore, the main controller 121 outputs, to the MEMS driver 123, a drive control signal for controlling driving of the optical scanner 30. The MEMS driver 123 outputs the received drive control signal to the optical scanner 30.

Furthermore, the main controller 121 outputs the input image data to the laser driver 124. The laser driver 124 generates, based on the image signal, an emission control signal to control turning on and turning off the light source (the laser module) 125, and the laser driver 124 outputs the generated emission control signal to the laser module 125.

The laser controller 122 is implemented by a processor, such as a CPU; a RAM; a ROM, etc. Upon detecting that a signal from the operation unit 13 to turn on the power supply, a zoom-in signal, or a zoom-out signal is input, the laser controller 122 outputs a control signal corresponding to the input signal to the laser module 125. Note that, upon receiving, at the selection switch of the operation unit 13, a selection of specific image data of the data from the two systems, the laser controller 122 according to the embodiment outputs a control signal to the laser module 125 in accordance with the selection.

In response to receiving an indication from the main controller 121, the laser module 125 outputs (emits), for example, a light beam L with one or more wavelengths to the optical scanner 30. The light beam L is the image light beam for projecting an image onto the retina G1 of the user's eye ball G. Note that the light beam L emitted from the laser module 125 is transmitted to the optical scanner 30 through the transmission cable 20.

For example, the laser module 125 emits a read laser beam (wavelength: approximately from 610 nm to 660 nm), a green laser beam (wavelength: approximately from 515 nm to 540 nm), and a blue laser beam (wavelength: approximately from 440 nm to 480 nm). The laser beams in colors of read, green, and blue, respectively, are emitted. The laser module 125 according to the embodiment is implemented, for example, by a light source in which laser diode chips in RGB (read, green, and blue), respectively, a device for combining the three colors, and a micro collimator lens are integrated.

Additionally, the laser module 125 is provided with a light amount sensor 125a and a temperature sensor 125b. The light amount sensor 125a detects a light amount of each laser diode of the laser module 125 and outputs the detected light amount information to the laser controller 122. The temperature sensor 125b detects a temperature of each laser diode of the laser module 125 and outputs the detected temperature information to the laser controller 122.

The laser controller 122 generates a signal for controlling the light amount of each laser diode of the laser module 125 based on the light amount information obtained from the light amount sensor 125a, and the laser controller 122 outputs the generated signal to the laser module 125.

Figure 3:
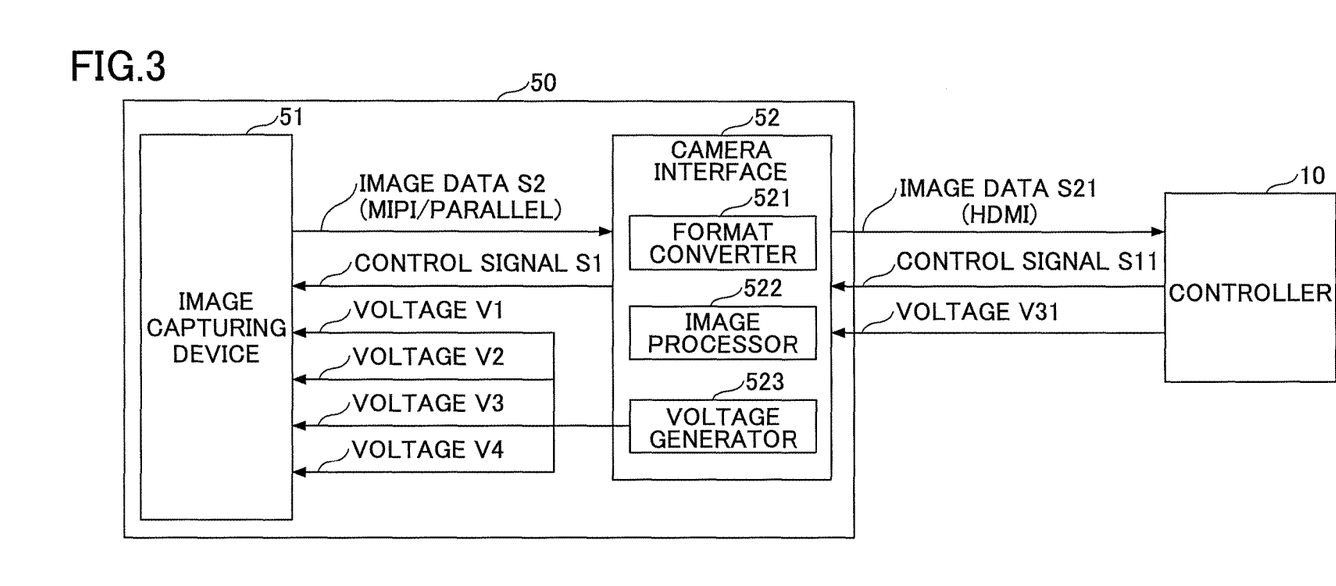
FIG. 3 is a diagram illustrating functions of a camera interface.

Next, by referring to FIG. 3, the camera interface 52 according to the embodiment is described. FIG. 3 is a diagram illustrating functions of the camera interface 52.

First, transmission and reception of signals and voltages between the image capturing device 51 and the camera interface 52 in the image capturing unit 50 are described.

An operation of the image capturing device 51 according to the embodiment is controlled by a control signal S1 output from the camera interface 52.

Specifically, the image capturing device 51 may be indicated to start capturing an image by a control signal S1. For example, in the controller 10, the start of capturing the image may be indicated, in response to detecting that a selection switch of the operation unit 13 is operated to select image data captured by the image capturing device 51. In this case, the controller 10 reports, to the camera interface 52, that the image capturing device 51 is indicated to start capturing the image by a control signal S11. Upon receiving the control signal S11, the camera interface 52 may transmit, to the image capturing device 51, the control signal S1 for indicating to start capturing the image.

Upon receiving the indication to start capturing the image, the image capturing device 51 starts capturing the image, and the image capturing device 51 transmits the captured image data to the camera interface 52. At this time, the image data S2 output from the image capturing device 51 is transmitted to the camera interface 52 in accordance with a Mobile Industry Processor Interface (MIPI) standard, which is one of interface standards with a camera, etc., included in a mobile terminal. Furthermore, image data S2 output from the image capturing device 51 is transmitted to the camera interface 52 by parallel communication.

Furthermore, voltages V1 through V4, which are the power sources, are supplied to the image capturing device 51 according to the embodiment through the camera interface 52.

Next, transmission and reception of signals and voltages between the camera interface 52 and the controller 10 are described.

The camera interface 52 according to the embodiment transmits, to the controller 10, image data S2 received from the image capturing device 51, as the image data S21 conforming to the Hi-Definition Multimedia Interface (HDMI: registered trademark) standard, which is a standard of a communication interface for transmitting video and/or audio.

Namely, the format converter 521 according to the embodiment converts image data conforming to the MIPI standard or image data transmitted by the parallel communication into the image data conforming to the HDMI standard. Here, the format conforming to the MIPI standard or the format conforming to the parallel transmission scheme is referred to as a first format, and the format conforming to the HDMI standard is referred to as a second format.

Furthermore, the camera interface 52 receives, from the controller 10, the control signal S11 for transmitting an indication to the image capturing device 51. The indication to the image capturing device 51 includes, for example, an indication to start capturing an image, or an indication to zoom in or zoom out.

Furthermore, the controller 10 supplies, to the camera interface 52, a voltage V31, which can be a power source of the camera interface 52.

Next, the functions of the camera interface 52 according to the embodiment are described. The camera interface 52 according to the embodiment is provided with the format converter 521; an image processor 522; and a voltage generator 523.

In the above-described camera interface 52, the functions of the format converter 521 and the image processor 522 may be implemented by a field-programmable gate array (FPGA); and the function of the voltage generator 523 may be implemented by a known step-up/down circuit, etc.

The format converter 521 converts the image data S2 transmitted from the image capturing device 51 into the image data S21 conforming to the standard, which is for transmitting data to the controller 10.

In response to an indication from the controller 10, the image processor 522 applies image processing to the image data S2 prior to the conversion by the format converter 521.

The voltage generator 523 generates a voltage supplied to the image capturing device 51.

Figure 4:
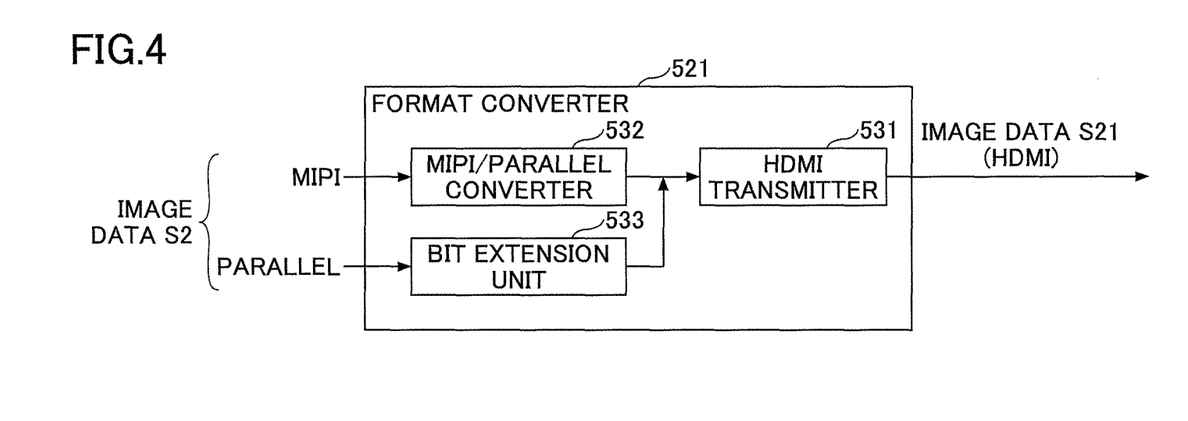
FIG. 4 is a diagram illustrating a format converter.

In the following, each component is further described. First, the format converter 521 is described. FIG. 4 is a diagram illustrating the format converter 521.

The format converter 521 according to the embodiment is provided with an HDMI transmitter 531; a MIPI/parallel converter 532; and a bit extension unit 533.

The HDMI transmitter 531 according to the embodiment converts the image data input as 8-bit input signals into the image data S21 conforming to the HDMI standard. Specifically, the HDMI transmitter 531 according to the embodiment receives R-component image data, G-component image data, and B-component image data of the RGB image data as the 8-bit input signals and converts the received signals into the image data conforming to the HDMI standard.

In response to detecting that the image data S2 is transmitted in accordance with the MIPI standard, the MIPI/parallel converter 532 converts each of the R component, the G component, and the B component of the image data S2 into an 8-bit input signal.

In response to detecting that the image data S2 is transmitted by the parallel communication, the bit extension unit 533 extends each of the R-component, the G-component, and the B-component of the image data S2 to an 8-bit signal.

More specifically, when the image data S2 is transmitted from the image capturing device 51 by the parallel communication, the image data S2 is transmitted as a signal in which the R component is 5 bits, the G component is 6 bits, and the B component is 5 bits. Accordingly, the bit extension unit 533 extends these signals to 8-bit signals for the respective components.

In the embodiment, as described above, by converting the image data S2 received from the image capturing device 51 into the image data S21 according to the HDMI standard, the image (video) data and the audio data captured by the image capturing device 51 can be transmitted to the controller 10 as a digital signal. Thus, according to the embodiment, noise can be reduced and degradation in image quality can be suppressed during transmission of the image data from the image capturing unit 50 to the controller 10 through the transmission cable 20.

Furthermore, according to the HDMI standard, the digitally modulated image data S21 is transmitted, so that there is no need to provide a restriction on a length of the transmission path.

Consequently, in the embodiment, there is no need to provide a restriction on the length of the transmission cable 20, which couples the head mount unit HM, in which the image capturing unit 50 is installed, to the controller 10. Namely, according to the embodiment, when the head mount unit HM is attached to a user's head, and when the controller 10 is accommodated in clothes, etc., of the user, the length of the transmission cable 20 can be sufficiently extended, so that a motion of the user is not to be interfered with. As a result, according to the embodiment, wearability of the retinal scanning head-mounted display 1 can be enhanced.

Furthermore, according to the embodiment, by converting the image data as described above, the number of the signal lines (pins) required for transmission of the image data can be reduced. Consequently, for example, compared to a case where the image data S2 is transmitted to the controller 10 by the parallel transmission, the diameter of the transmission cable 20 can be reduced when the image data is transmitted in accordance with the HDMI standard.

As the diameter of the transmission cable 20 becomes smaller, the stiffness of the transmission cable 20 is reduced, and a motion of a user becomes less restricted. Thus, according to the embodiment, wearability of the retinal scanning head-mounted display 1 can be enhanced.

Next, the image processor 522 is described.

In response to receiving, from the controller 10, an indication to zoom in or zoom out, the image processor 522 according to the embodiment applies the corresponding image processing to the image data S2 received from the image capturing device 51. Details of the image processor 522 are described below.

Next, the voltage generator 523 is described. The voltage generator 523 according to the embodiment generates the voltages V1 through V4 from the voltage V 31 supplied from the controller 10 and supplies the voltages V1 through V4 to the image capturing device 51.

The voltages V1 through V4 that can be the power source of the image capturing device 51 are the voltages with predetermined values according to a specification of the image capturing device 51. Each of the voltages V1 through V4 can take a plurality of values.

In the image capturing device 51, for example, an absolute value of a voltage that is supplied, as a power source, to a motor, etc., for driving a mechanism for capturing an image is different from an absolute value of a voltage that is supplied, as a power source, to an integrated circuit (IC) chip, etc., for executing various types of control in the image capturing device 51. Accordingly, in the camera interface 52 according to the embodiment, a voltage with a value that is required in the image capturing device 51 is generated and the generated voltage is supplied to the image capturing device 51.

Note that the voltage generator 523 may generate a voltage with a value that is required by the voltage generator 523 itself, other than the voltages V1 through V4 to be supplied to the image capturing device 51. Furthermore, the values of the voltages supplied to the image capturing device 51 may include a value other than the values of the voltages V1 through V4.

In the embodiment, the voltages supplied to the image capturing device 51 are generated and supplied by the camera interface 52 located in the vicinity of the image capturing device 51. Accordingly, in the embodiment, compared to a case where the voltages are supplied from the controller 10, which is physically more separated from the image capturing device 51 than the camera interface 52, a voltage drop (loss) caused by a power supply line can be suppressed. In other words, in the embodiment, the voltages that can be the power sources of the image capturing device 51 are generated by the camera interface 52 located in the vicinity of the image capturing device 51, so that the voltage loss due to the resistance of the power supply line that couples the image capturing device 51 to the camera interface 52 can be reduced.

Figure 5:
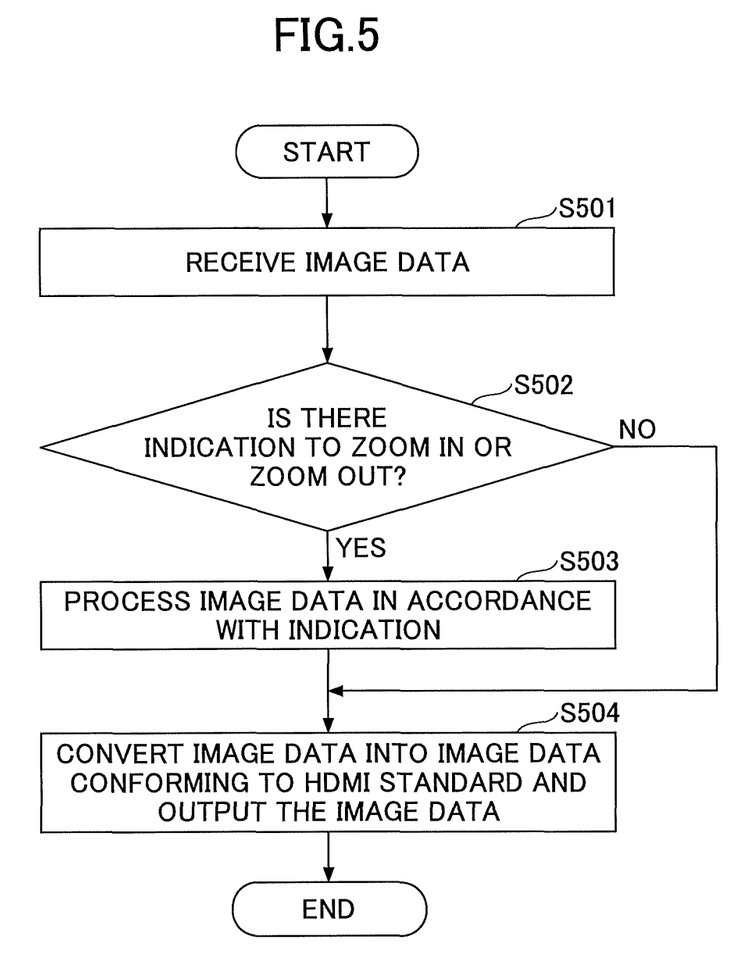
FIG. 5 is a flowchart illustrating a process of the camera interface.

Next, by referring to FIG. 5, a process is described when the camera interface 52 according to the embodiment receives the image data from the image capturing device 51. FIG. 5 is a flowchart illustrating a process executed by the camera interface 52.

The camera interface 52 according to the embodiment receives image data from the image capturing device 51 (step S501). Subsequently, in the camera interface 52, the image processor 522 determines whether an indication to zoom in or zoom out is received (step S502).

At step S502, upon receiving the above-described indication, the image processor 522 applies the image processing corresponding to the indication to the received image data (step S503).

Upon detecting that the above-described indication is not received at step S502, in the camera interface 52, the format converter 521 converts the received image data into the image data S21 conforming to the HDMI standard to output the image data S21 to the controller 10 (step S504) and terminates the process.

In the following, by referring to FIG. 6 and FIG. 7, the image processing by the image processor 522 at step S503 of FIG. 5 is described. FIGS. 6A and 6B are diagrams illustrating the image processing by the image processor 522.

Figure 6A:
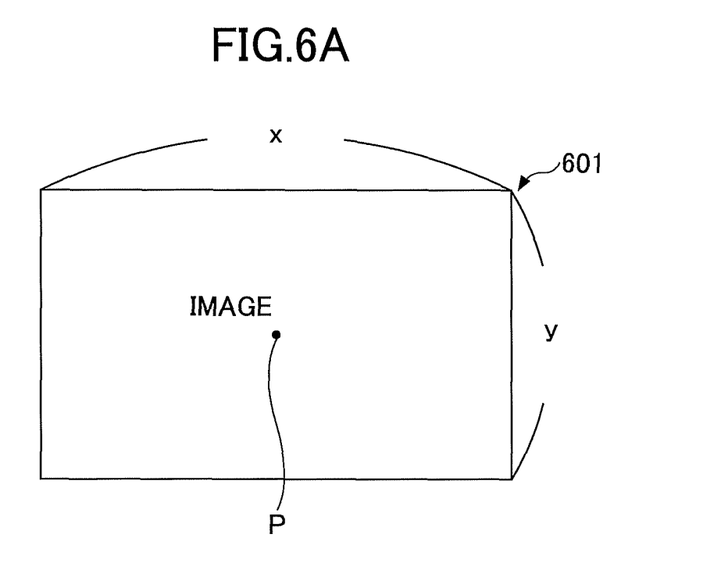
FIG. 6A is a diagram illustrating an image process by an image processor.
Figure 6B:
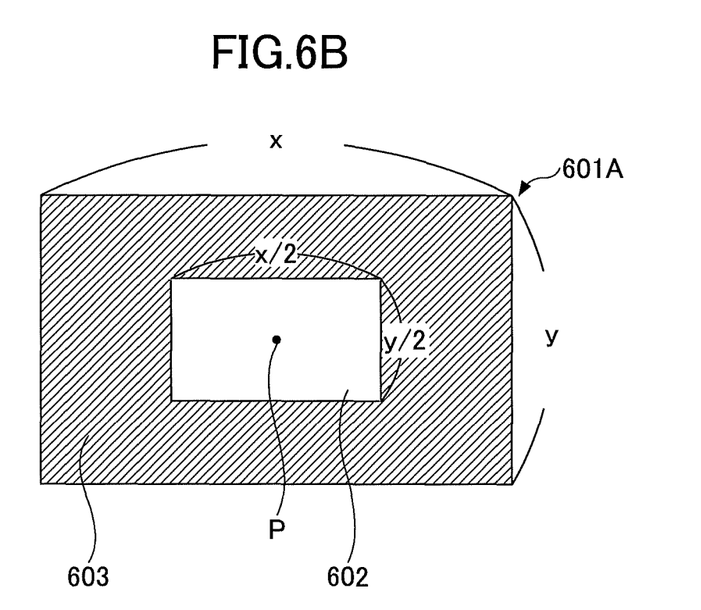
FIG. 6B is a diagram illustrating the image process by the image processor.

FIGS. 6A and 6B illustrate the image processing when, at the operation unit 13 of the controller 10, an operation is made that is for indicating to zoom in. FIG. 6A illustrates an image prior to applying the image processing, and FIG. 6B illustrates an image after applying the image processing.

FIG. 6A illustrates an image 601 where neither the indication to zoom in nor the indication to zoom out is received. Here, the image 601 is an image with x pixels by y pixels, and the center point is the point P.

When image processing corresponding to zoom-in with a magnification of, for example, two is applied to the image 601, the image 601 becomes the image 601A illustrated in FIG. 6B.

The image 601A is an image with x pixels by y pixels, with the point P as the center. Namely, the image 601A is an image with the size that is the same as the size of the image 601 prior to applying the image processing.

The image 601A includes a region 602 and a black region 603 that masks the periphery of the region 602. The region 602 is a region with x/2 pixels by y/2 pixels, with the point P as the center.

Upon receiving an indication to zoom in with the magnification of two, for example, through the control signal S11, the image processor 522 according to the embodiment creates the image 601A by masking, with a single black color, the region 603 that is outside the region 602 with x/2 pixels by y/2 pixels having the point P as the center to obtain the black region 603, in the image data of the image 601 obtained from the image capturing device 51.

Then, the image processor 522 passes the image 601A to the format converter 521. The format converter 521 converts the image data of the image 601A into image data conforming to the HDMI standard and transmits the converted image data to the controller 10.

By scanning the image data of the image 601A, the controller 10 projects, onto a user's retina, the image obtained by zooming in the image 601 with the magnification of two. Note that the controller 10 executes control of the optical scanner 30, which control corresponds to the indication to zoom in with the magnification of two.

In FIG. 6, the process is described that is executed by the image processor 522 upon receiving the indication to zoom in. Upon receiving an indication to zoom out, the image processor 522 according to the embodiment may execute the process opposite to the process corresponding to the indication to zoom in.

For example, when an indication to zoom out with a magnification of two is received, the black region 603 may be deleted from the image 601A.

Note that, in the embodiment, image processing corresponding to the indication to zoom out can be applied to the image to which image processing has been applied once in accordance with the indication to zoom in. Additionally, in the embodiment, the image processing corresponding to the indication to zoom out may not be applied to an image to which image processing corresponding to an indication to zoom in has not been applied.

Figure 7A:
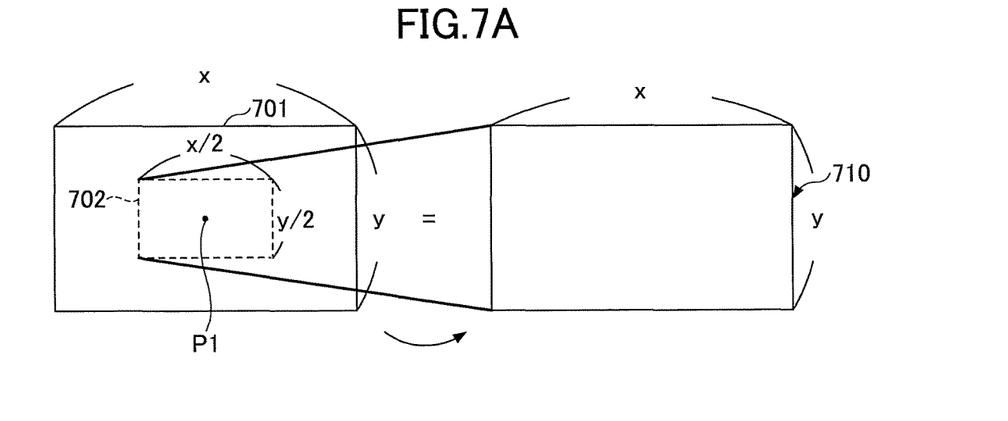
FIG. 7A is a diagram illustrating the image process by the image processor.
Figure 7B:
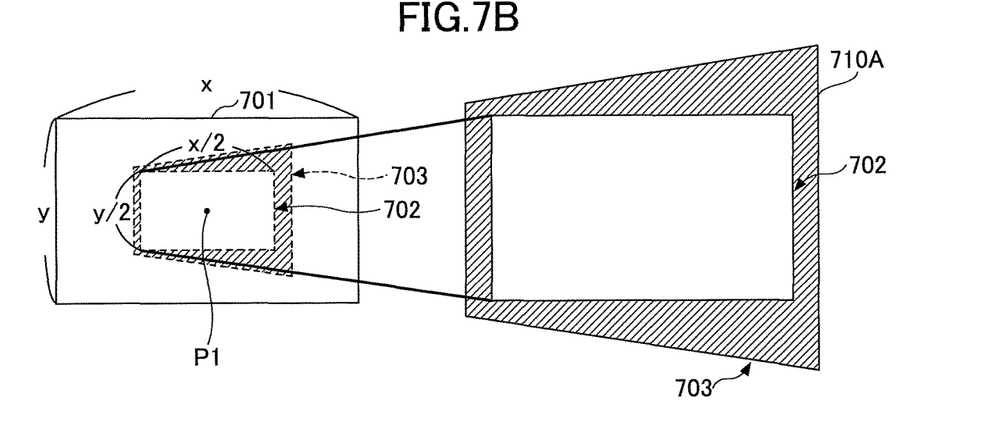
FIG. 7B is a diagram illustrating the image process by the image processor.
Figure 7C:
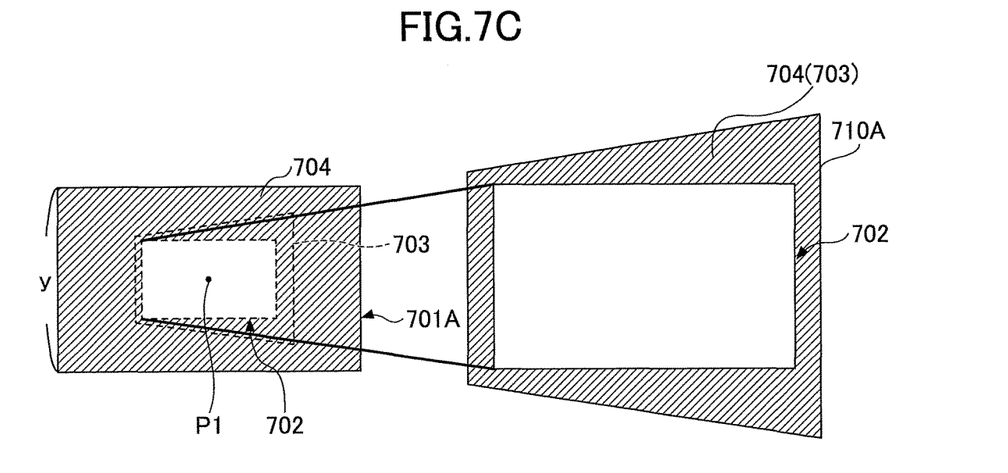
FIG. 7C is a diagram illustrating the image process by the image processor.

Next, the reason for providing, in the image processing corresponding to zoom-in in the embodiment, the black region 603 is described by referring to FIG. 7.

FIGS. 7A through 7C are diagrams illustrating the image processing by the image processor 522. FIG. 7A is a diagram illustrating the image processing corresponding to zoom-in by a generic projector. FIG. 7B is a first diagram illustrating the image processing corresponding to zoom-in according to the embodiment. FIG. 7C is a second diagram illustrating the image processing corresponding to zoom-in according to the embodiment.

As illustrated in FIG. 7A, for a projector with a projection area that is a planar screen, etc., when an indication to zoom in with a magnification of two is detected for an image 701 with x pixels by y pixels having the point P1 as the center, the image, within the image 701, of the region with x/2 pixels by y/2 pixels having the point P1 as the center may be projected onto a projection area 710. Note that the projection area is an area scanned by the optical scanner 30.

By projecting the image as described above, the image of the region 702 is projected onto the entire projection area 710 because, in the example of FIG. 7A, the size and the shape of the projection area 710 match the size and the shape of the image projected onto the projection area 170.

In contrast, when an image is irradiated onto a retina of a human, as in the embodiment, the retina, as a projection surface, is a curved surface instead of a planar surface because the eyeball is spherical. For this reason, in the embodiment, a projection surface is scanned in a trapezoidal shape, so that the projection surface matches the curved surface of the retina. Accordingly, in the embodiment, the shape of the projection area 710A is a trapezoidal shape, as illustrated in FIG. 7B and FIG. 7C.

Thus, in the embodiment, as illustrated in FIG. 7B, even if an attempt is made to project, within the image 701, only the image in the region 702 with x/2 pixels by y/2 pixels having the point P1 as the center onto the projection area 710A, the image in a region 703 within the image 701 is actually projected.

In this case, an image other than the image to be actually focused on is to be projected onto the user's retina, which is not preferable.

Thus, as illustrated in FIG. 7C, the image processor 522 according to the embodiment converts the image 701 into the image 701A, which is obtained by converting a region other than the region 702 to be projected onto the projection area 710A into a black region 704 by masking the region with a single black color.

In the embodiment, the optical scanner 30 controls the laser diode so as not to emit light for an image in a black color. Namely, the optical scanner 30 turns off the laser diode for the region inside the black region 704 within the image 701A.

Consequently, when the image 701A is projected by the retinal scanning head-mounted display according to the embodiment, the image other than the image in the region 702 is not projected onto the projection area 710A.

Thus, according to the embodiment, the following problem can be solved. Namely, the problem is such that, when a projection surface is a curved surface, such as a retina, and when an image is to be magnified and projected, an image other than the image desired to be focused on by a user is also magnified and projected. In short, according to the embodiment, only the image in a region desired to be focused on by the user can be magnified and projected.

Furthermore, in the embodiment, upon receiving an indication to zoom in, the image processor 522 executes the above-described image processing prior to converting, by the camera interface 52, the format of the image data S2.

According to the embodiment, it is not necessary to execute, by the controller 10, image processing corresponding to an indication to zoom in, and only an image in a region desired to be focused on by a user can be magnified and projected by the above-described process. Consequently, a processing load on the controller 10 can be reduced.

Note that, in the description above, it is assumed that the embodiment is applied to the retinal scanning head-mounted display. However, the embodiment is not limited to this. The embodiment may be applied to any projector, provided that an optical scanner 30 and an image capturing unit 50 are coupled to a controller 10 through a transmission cable 20 in the projector.

The optical scanning head-mounted display and the retinal scanning head-mounted display are described above by the embodiment. However, the optical scanning head-mounted display and the retinal scanning head-mounted display according to the present invention are not limited to the above-described embodiment, and various modifications and improvements may be made within the scope of the present invention. The present application is based on and claims the benefit of priority of Japanese Priority Application No. 2016-192102, filed on Sep. 29, 2016, the entire contents of which are hereby incorporated herein by reference.

What is claimed is:

1. An optical scanning head-mounted display comprising:
   a head mount unit including
      an optical scanner that scans the light beam to irradiate a light beam onto a projection plane,
      an image capturing device that outputs image data of a captured image as the image data in a first format, and
      an interface that converts the image data in the first format obtained from the image capturing device into the image data in a second format and outputs the image data in the second format, wherein the second format is a format for transmitting audio and video as a digital signal;
   a transmission cable that transmits the image data in the second format, wherein the image data in the second format is digitally converted by the interface; and
   a controller that includes a light source that emits the light beam, that receives the image data in the second format through the transmission cable, that generates, based on the image data in the second format, an emission control signal to control turning on and turning off the light source, and that outputs the generated emission control signal to the light source.

2. The optical scanning head-mounted display according to claim 1, wherein the first format is a format conforming to a Mobile Industry Processor Interface (MIPI) standard or a format conforming to a parallel communication scheme, and
   wherein the second format is a format conforming to a Hi-Definition Multimedia Interface (HDMI) standard.

3. The optical scanning head-mounted display according to claim 1, wherein the interface is provided with an image processor that applies image processing to the image data in the first format, and
   wherein, upon receiving, by the controller, an operation for indicating to zoom in, the image processor changes a color of a region other than a region to be zoomed in into a black color in the image represented by the image data in the first format and outputs the image data in the first format to the interface.

4. The optical scanning head-mounted display according to claim 1, wherein the interface is provided with a voltage generator that receives supply of a voltage with a predetermined value from the controller through the transmission cable to generate a plurality of voltages with a respective plurality of values to be supplied to the image capturing device.

5. The optical scanning head-mounted display according to claim 1, wherein the optical scanner irradiates the light beam onto a retina of a user.

6. A retinal scanning head-mounted display comprising:
   a head mount unit including
      an optical scanner that scans the light beam to irradiate the light beam onto a retina of a user,
      an image capturing device that outputs image data of a captured image as the image data in a first format, and
      an interface that converts the image data in the first format obtained from the image capturing device into the image data in a second format and outputs the image data in the second format, wherein the second format is a format for transmitting audio and video as a digital signal;
   a transmission cable that transmits the image data in the second format, wherein the image data in the second format is digitally converted by the interface; and
   a controller that includes a light source that emits the light beam, that receives the image data in the second format through the transmission cable, that generates, based on the image data in the second format, an emission control signal to control turning on and turning off the light source, and that outputs the generated emission control signal to the light source.

* * * * *